(12) United States Patent
Hundley

(10) Patent No.: US 6,209,687 B1
(45) Date of Patent: Apr. 3, 2001

(54) DUAL BRAKE HANDLE

(76) Inventor: Travis S. Hundley, 13635 SW. Walnut La., Tigard, OR (US) 97223

(*) Notice: Subject to any disclaimer, the term of this patent is extended or adjusted under 35 U.S.C. 154(b) by 0 days.

(21) Appl. No.: 09/347,347

(22) Filed: Jul. 2, 1999

(51) Int. Cl.[7] .................................................. B62L 1/06
(52) U.S. Cl. ........................................ 188/24.16; 188/344
(58) Field of Search ............................. 188/24.16, 24.22, 188/151 R, 344, 345, 359; 74/491; 60/550

(56) References Cited

U.S. PATENT DOCUMENTS

| 4,267,746 | * | 5/1981 | Pruett ..................................... 74/489 |
| 5,372,408 | * | 12/1994 | Tsuchida et al. ................... 303/9.64 |
| 5,918,464 | * | 7/1999 | Pape et al. ............................ 60/565 |

* cited by examiner

Primary Examiner—Chris Schwartz
(74) Attorney, Agent, or Firm—Daniel V. Thompson

(57) ABSTRACT

A dual handle brake (10) has a dual master cylinder (12) having a dual master cylinder rear brake fluid pipe (12A) attached thereto connected to a first master cylinder. A half pipe configured front brake handle (14A) is movably attached to the dual master cylinder front brake connector (12D). A cylindrical rear brake handle (14B) is movably attached to the dual master cylinder rear brake connector (12C). A U-shaped brake connector (14C) has a sufficient width to accept the cylindrical rear brake handle (14B) having the front brake handle (14A) contained therein. An attacher (16) securely connected to the dual master cylinder (12) and removably connectable to a handle bar (18).

9 Claims, 5 Drawing Sheets

DUAL BRAKE HANDLE

TECHNICAL FIELD

The present invention relates to motorcycle or bicycle brakes. More particularly, the present invention relates to a dual handle brakes for motorcycle or bicycle brakes.

BACKGROUND ART

Braking systems for motorcycles, bicycles and all terrain vehicles are well known in the art. They differ in size, shape and components such as disc, drum or dual pad brakes. However, there is no prior art describing or claiming a dual brake system utilizing pressurized fluid and a dual master cylinder. The uniqueness of the present invention allows the brake handle to act as a single brake handle or a double brake handle by the way the user positions his/her hand.

Numerous innovations for braking systems have been provided in the prior art that are described as follows. Even though these innovations may be suitable for the specific individual purposes to which they address, they differ from the present invention as hereinafter contrasted.

In U.S. Pat. No. 4,267,746, titled, Single hand-operated dual brake actuator, by inventor Pruett, a single hand-operated actuator for effecting operation of two devices, such as the front and rear caliper brakes of a bicycle or the like. The actuator includes a base adapted to be secured to the handle bars of a bicycle and having two Bowden sliding wire or cable linkages thereon with the linkages being interconnected to a lever operated by one hand for effecting actuation of both the front and rear brakes of the bicycle via the linkages. In another version of the actuator of this invention, a mechanical power assist is provided for aiding operation of the actuator. Other US related patents include: U.S. Pat. Nos. 3,960,030, 4,267,746, 1,674,751, 1,763,096 and 1,910,527.

The above patented inventions differ from the present invention because they fail to describe or claim at least one combination of the following features depicted in the present invention such as dual master cylinder, half pipe shaped front brake handle with front brake handle inner end lever and front brake handle inner end lever adjuster, rear brake handle with rear brake handle inner end lever and rear brake handle inner end lever adjuster, and brake connector.

Numerous innovations for braking systems have been provided in the prior art that are adapted to be used. Even though these innovations may be suitable for the specific individual purposes to which they address, they would not be suitable for the purposes of the present invention as heretofore described.

SUMMARY OF THE INVENTION

The present invention relates to motorcycle or bicycle brakes. More particularly, the present invention relates to a dual handle brakes for motorcycle or bicycle brakes. The novelty of the present invention is a dual master cylinder having a split handle so that the same hand can actuate either both front and rear, or rear only. In specific types of racing such as motorcross, it is essential that only the rear wheel be braked for slides and turns. The front lever is never actuated because it is too dangerous. Conventional motorcycles have a foot pedal for the rear brake, but this is undesirable for rough motorcross conditions.

The types of problems encountered in the prior art are conventional motorcycles and terrain vehicles have for the rear brake and bicycles have two separate brake handles one on each side of the handle bar.

In the prior art, unsuccessful attempts to solve this problem were attempted namely: using foot pedals in combination with hand brakes or dual hand brakes with differing functionality. However, the problem was solved by the present invention because it activates only the front and rear brake or rear brake only never the front brake only.

Innovations within the prior art are rapidly being exploited in the field of motorcross.

The present invention went contrary to the teaching of the art which describes and claims foot pedals in combination with hand brakes or dual hand brakes with differing functionality.

The present invention solved a long felt need for a single split handle to control the front and rear brake.

The present invention produced unexpected results namely: less foot and leg injuries resulted from riders using the present invention rather than conventional foot pedals in motorcross racing.

Accordingly, it is an object of the present invention to provide a dual handle brake having a dual master cylinder, front brake handle, rear brake handle, brake connector and attacher mountable on a handle bar.

More particularly, it is an object of the present invention to provide the dual master cylinder having a dual master cylinder rear brake fluid pipe, dual master cylinder front brake fluid pipe, dual master cylinder rear brake connector, and dual master cylinder front brake connector.

In keeping with these objects, and with others which will become apparent hereinafter, one feature of the present invention resides, briefly stated, in the front brake handle having a front brake handle outer end and front brake handle inner end.

When the front brake handle inner end is designed in accordance with the present invention, it has a front brake handle inner end lever with a front brake handle inner end lever adjuster and a front brake handle inner end opening.

In accordance with another feature of the present invention, the rear brake handle has a rear brake handle outer end and a rear brake handle inner end.

Another feature of the present invention is that the rear brake handle outer has a rear brake handle outer end knob.

Yet another feature of the present invention is that the rear brake handle inner end has a rear brake handle inner end lever with a rear brake handle inner end lever adjuster and a rear brake handle inner end opening.

Still another feature of the present invention is that the brake connector has a brake connector fastener with a brake connector fastener first washer, brake connector fastener second washer, and brake connector fastener nut.

Yet still another feature of the present invention is that the attacher has an upper attacher with an upper attacher opening, a lower attacher with a lower attacher opening, and an attacher fastener with an attacher fastener nut.

The novel features which are considered characteristic for the invention are set forth in the appended claims. The invention itself, however, both as to its construction and its method of operation, together with additional objects and advantages thereof, will be best understood from the following description of the specific embodiments when read and understood in connection with the accompanying drawings.

LIST OF REFERENCE NUMERALS UTILIZED IN THE DRAWINGS

10 —dual handle brake (10)

12 —dual master cylinder (12)

12A —dual master cylinder rear brake fluid pipe (12A)
12B —dual master cylinder front brake fluid pipe (12B)
12C —dual master cylinder rear brake connector (12C)
12D —dual master cylinder front brake connector (12D)
14A —front brake handle (14A)
14AA —front brake handle outer end (14AA)
14AB —front brake handle inner end (14AB)
14ABA —front brake handle inner end lever (14ABA)
14ABAA —front brake handle inner end lever adjuster (14ABAA)
14ABB —front brake handle inner end opening (14AB)
14B —rear brake handle (14B)
14BA —rear brake handle outer end (14BA)
14BAA —rear brake handle outer end knob (14BAA)
14BB —rear brake handle inner end (14BB)
4BBA —rear brake handle inner end lever (14BBA)
14BBAA —rear brake handle inner end lever (14BBAA)
14BBB —rear brake handle inner end opening (14BBB)
14C —brake connector (14C)
14CA —brake connector fastener (14CA)
14CAAA —brake connector fastener first washer (14CAAA)
14CAAB —brake connector fastener second washer (14CAAB)
14CAB —brake connector fastener nut (14CAB)
16 —attacher (16)
16A —upper attacher (16A)
16AA —upper attacher opening (16AA)
16B —lower attacher (16B)
16BA —lower attacher opening (16BA)
16C —attacher fastener (16C)
16CA —attacher fastener nut (16CA)
18 —handle bar (18)
18A —handle bar grip (18A)

BRIEF DESCRIPTION OF THE DRAWINGS

A more complete understanding of the invention and its advantages will be apparent from the Detailed Description taken in conjunction with the accompanying Drawings, in which.

DETAILED DESCRIPTION OF THE PREFERRED EMBODIMENT

Figure 1:
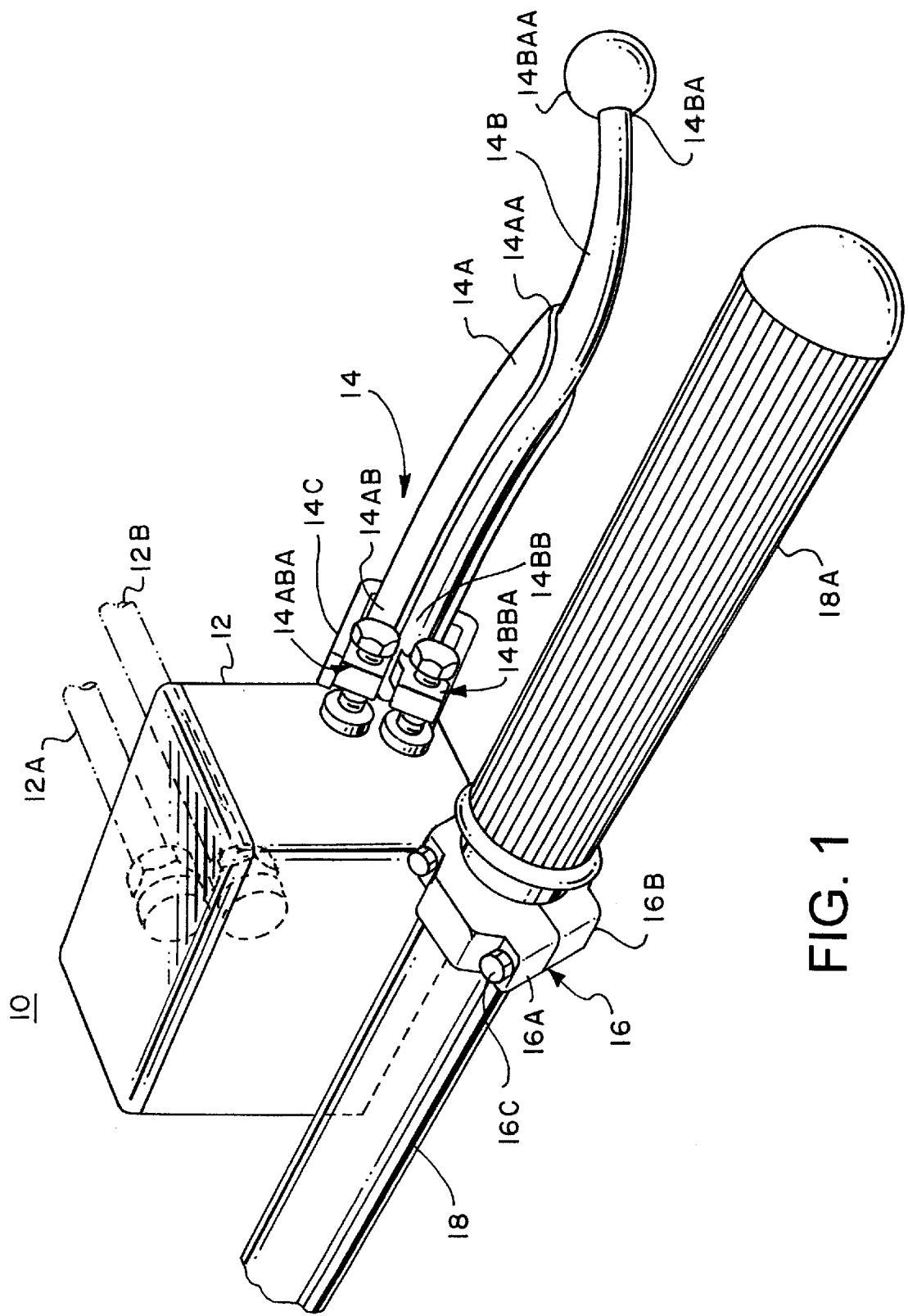
FIG. 1 is a perspective view of a dual handle brake (10) attached to a handle bar (18) with a handle bar grip (18A).
Figure 6:
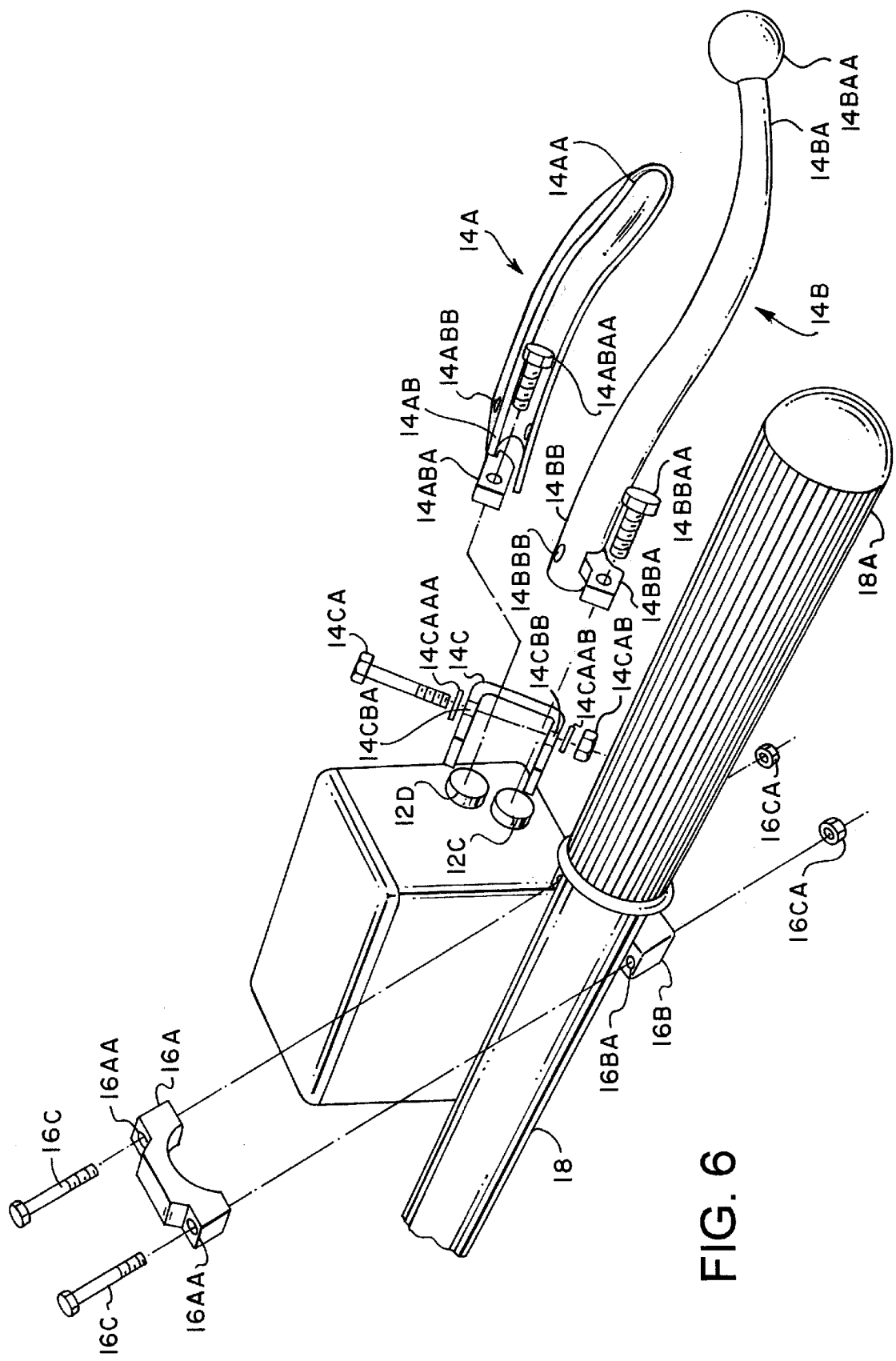
FIG. 6 is an exploded perspective view of a dual handle brake (10) attached to a handle bar (18) with a handle bar grip (18A).

Referring to FIG. 1 and FIG. 6 which are perspective and exploded views, respectively, of a dual handle brake (10) attached to a handle bar (18) with a handle bar grip (18A). The dual handle brake (10) can be utilized on any type of vehicle having handle bars. Such vehicles include motorcycles, bicycles, all terrain vehicles, and all terrain cycles. The dual handle brake (10) comprises a dual master cylinder (12) having a dual master cylinder rear brake fluid pipe (12A) attached thereto connected to a first master cylinder (not shown) and to a rear brake (not shown). The dual master cylinder (12) further comprises a dual master cylinder front brake fluid pipe (12B) attached thereto connected to a second master cylinder (not shown) and front brake (not shown). The dual master cylinder (12) further comprises a dual master cylinder rear brake connector (12C) and a dual master cylinder front brake connector (12D).

The dual handle brake (10) further comprises a half pipe configured front brake handle (14A) comprises a front brake handle outer end (14AA) and a front brake handle inner end (14AB) having a front brake handle inner end opening (14AB) therethrough. The front brake handle (14A) is movably attached to the dual master cylinder front brake connector (12D).

The dual handle brake (10) further comprises a cylindrical rear brake handle (14B) comprises a rear brake handle outer end (14BA) and a rear brake handle inner end (14BB) having a rear brake handle inner end opening (14BBB) therethrough. The rear brake handle (14B) is movably attached to the dual master cylinder rear brake connector (12C). The half pipe configured front brake handle (14A) comprises a complimentary configuration to the cylindrical rear brake handle (14B).

The dual handle brake (10) further comprises a U-shaped brake connector (14C) comprises two U-shaped brake connector openings (not shown). A first U-shaped brake connector opening (not shown) and a second U-shaped brake connector opening (not shown). Each of the U-shaped brake connector openings (not shown) are positioned in a middle on each opposite side of the U-shaped brake connector (14C). The U-shaped brake connector (14C) further comprises an opening having sufficient width to accept the cylindrical rear brake handle (14B) having the front brake handle (14A) contained therein. A brake connector fastener (14CA) is positioned through the first U-shaped brake connector opening (not shown) and the front brake handle inner end opening (14AB) and the rear brake handle inner end opening (14BBB) and the second U-shaped brake connector opening (not shown). The brake connector fastener (14CA) preferably has a brake connector fastener first washer (14CAAA), brake connector fastener second washer (14CAAB), and brake connector fastener nut (14CAB).

The dual handle brake (10) further comprises an attacher (16) securely connected to the dual master cylinder (12) and removably connectable to a handle bar (18).

Unlike other two handle braking systems, the dual master cylinder (12) functions that when the front brake handle (14A) and the rear brake handle (14B) are squeezed simultaneously, the front brake never only activated but simultaneously both the rear and front brakes are activated for safety purposes. When the rear brake handle (14B) is squeezed simultaneously, the rear brake is only activated.

Figure 2:
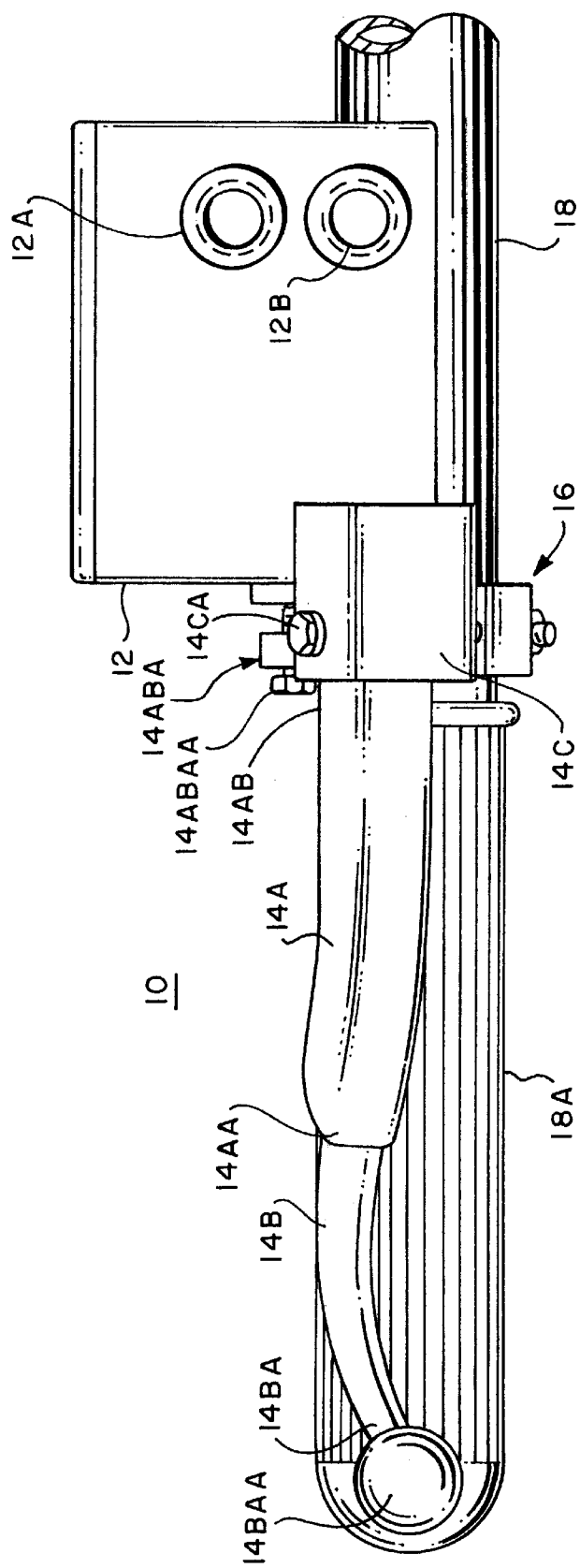
FIG. 2 is a side view of a dual handle brake (10) attached to a handle bar (18) with a handle bar grip (18A).
Figure 3:
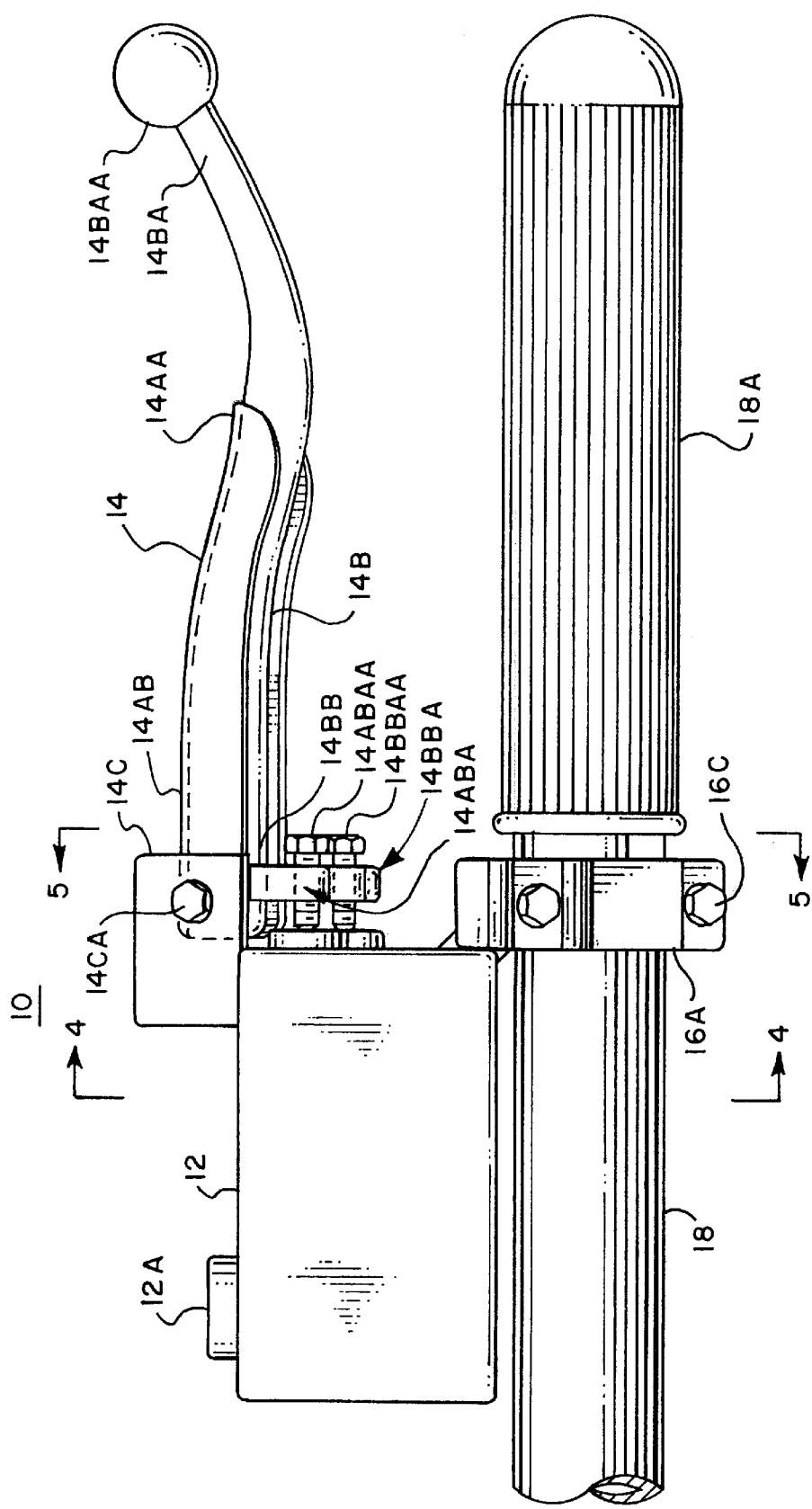
FIG. 3 is a top view of a dual handle brake (10) attached to a handle bar (18) with a handle bar grip (18A).

Now referring to FIG. 2 and FIG. 3 which is a side, top view of a dual handle brake (10) attached to a handle bar (18) with a handle bar grip (18A). The rear brake handle outer end (14BA) comprises a rear brake handle outer end knob (14BAA) securely attached to a distal end functioning as a safety means preventing a user's hand from slipping off of the rear brake handle (14B). The attacher (16) comprises an upper attacher (16A) having two upper attacher openings (16AA) each on opposite distal ends. The attacher (16) further comprises a lower attacher (16B) having two lower attacher openings (16BA) each on opposite distal ends. Two attacher fasteners (16C) each of which are securely positioned within the two upper attacher openings (16AA) and the two lower attacher openings (16BA). The attacher (16) further comprises an attacher fastener nut (16CA) securely attached thereto.

Figure 4:
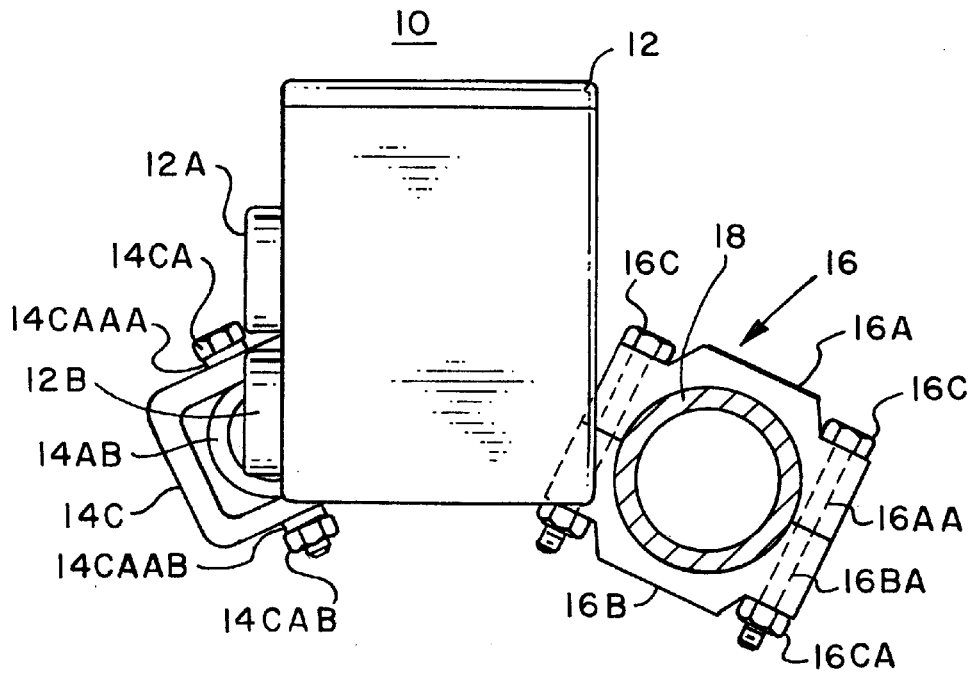
FIG. 4 is a view of a dual handle brake (10) along line 4—4 of FIG. 2.
Figure 5:
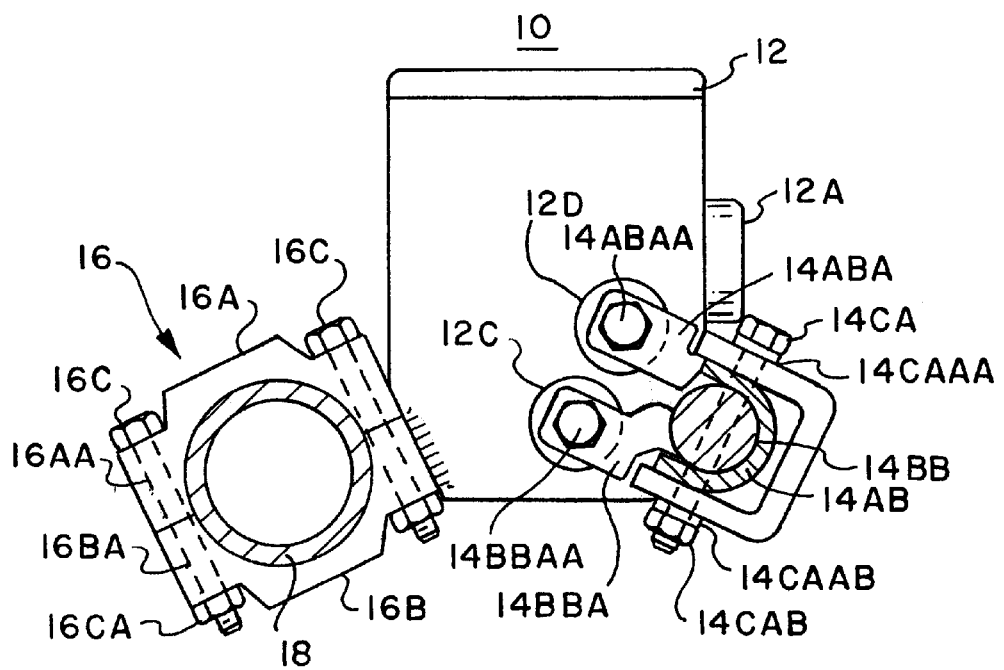
FIG. 5 is a view of a dual handle brake (10) along line 5—5 of FIG. 2.

Lastly, referring to FIG. 4 and FIG. 5 which are views of a dual handle brake (10) along line 5—5 and 4—4 of FIG. 2, respectively. The front brake handle inner end (14AB) further comprises a front brake handle inner end lever (14ABA) extending perpendicularly therefrom attached to the dual master cylinder front brake connector (12D). The front brake handle inner end lever (14ABA) comprises a front brake handle inner end lever adjuster (14ABAA) attached to the dual master cylinder front brake connector (12D). The rear brake handle inner end (14BB) further comprises a rear brake handle inner end lever (14BBA) extending perpendicularly therefrom attached to the dual master cylinder rear brake connector (12D). The rear brake handle inner end lever (14BBA) comprises a rear brake handle inner end lever adjuster (14BBAA) attached to the dual master cylinder rear brake connector (12C).

It will be understood that each of the elements described above, or two or more together, may also find a useful application in other types of constructions differing from the type described above.

While the invention has been illustrated and described as embodied in a braking systems, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

Whereas, the present invention has been described with respect to a specific embodiment thereof, it will be understood that various changes and modifications will be suggested to one skilled in the art and it is intended to encompass such changes and modifications as fall within the scope of the appended claims.

I claim:

1. A dual handle brake (10) comprising:
A) A dual master cylinder (12) which comprises a dual master cylinder rear brake fluid pipe (12A) attached thereto connected to a first master cylinder, the dual master cylinder rear brake fluid pipe (12A) is connected to at least one rear brake, the dual master cylinder (12) further comprises a dual master cylinder front brake fluid pipe (12B) attached thereto connected to a second master cylinder, the dual master cylinder front brake fluid pipe (12B) is connected to at least one front brake, the dual master cylinder (12) further comprises a dual master cylinder rear brake connector (12C) and a dual master cylinder front brake connector (12D);
B) a half pipe configured front brake handle (14A) movably attached to the dual master cylinder front brake connector (12D);

C) a cylindrical rear brake handle (14B) movably attached to the dual master cylinder rear brake connector (12C), the half pipe configured front brake handle (14A) comprises a complimentary configuration to the cylindrical rear brake handle (14B); and D) an attacher (16) securely connected to the dual master cylinder (12) and removably connectable to a handle bar (18).

2. A dual handle brake (10) comprising:
A) a dual master cylinder (12) which comprises a dual master cylinder rear brake fluid pipe (12A) attached thereto connected to a first master cylinder, the dual master cylinder rear brake fluid pipe (12A) is connected to at least one rear brake, the dual master cylinder (12) further comprises a dual master cylinder front brake fluid pipe (12B) attached thereto connected to a second master cylinder, the dual master cylinder front brake fluid pipe (12B) is connected to at least one front brake, the dual master cylinder (12) further comprises a dual master cylinder rear brake connector (12C) and a dual master cylinder front brake connector (12D);
B) a half pipe configured front brake handle (14A) comprises a front brake handle outer end (14AA) and a front brake handle inner end (14AB) having a front brake handle inner end opening (14AB) therethrough, the front brake handle (14A) is movably attached to the dual master cylinder front brake connector (12D);
C) a cylindrical rear brake handle (14B) comprises a rear brake handle outer end (14BA) and a rear brake handle inner end (14BB) having a rear brake handle inner end opening (14BBB) therethrough, the rear brake handle (14B) is movably attached to the dual master cylinder rear brake connector (12C), the half pipe configured front brake handle (14A) comprises a complimentary configuration to the cylindrical rear brake handle (14B);
D) a U-shaped brake connector (14C) comprises two U-shaped brake connector openings, a first U-shaped brake connector opening and a second U-shaped brake connector opening, each of the U-shaped brake connector openings are positioned in a middle on each opposite side of the U-shaped brake connector (14C), the U-shaped brake connector (14C) further comprises a sufficient width to accept the cylindrical rear brake handle (14B) having the front brake handle (14A) contained therein, a brake connector fastener (14CA) is positioned through the first U-shaped brake connector opening and the front brake handle inner end opening (14AB) and the rear brake handle inner end opening (14BBB) and the second U-shaped brake connector opening; and
E) an attacher (16) securely connected to the dual master cylinder (12) and removably connectable to a handle bar (18).

3. The dual handle brake (10) as described in claim 2, wherein the front brake handle inner end (14AB) further comprises a front brake handle inner end lever (14ABA) extending perpendicularly therefrom attached to the dual master cylinder front brake connector (12D).

4. The dual handle brake (10) as described in claim 3, wherein the front brake handle inner end lever (14ABA) comprises a front brake handle inner end lever adjuster (14ABAA) attached to the dual master cylinder front brake connector (12D).

5. The dual handle brake (10) as described in claim 2, wherein the rear brake handle inner end (14BB) further comprises a rear brake handle inner end lever (14BBA) extending perpendicularly therefrom attached to the dual master cylinder rear brake connector (12D).

6. The dual handle brake (10) as described in claim 5, wherein the rear brake handle inner end lever (14BBA) comprises a rear brake handle inner end lever adjuster (14BBAA) attached to the dual master cylinder rear brake connector (12C).

7. The dual handle brake (10) as described in claim 2, wherein the rear brake handle outer end (14BA) comprises a rear brake handle outer end knob (14BAA) securely attached to a distal end functioning as a safety means preventing a user's hand from slipping off of the rear brake handle (14B).

8. The dual handle brake (10) as described in claim 2, wherein the attacher (16) comprises an upper attacher (16A) having two upper attacher openings (16AA) each on opposite distal ends, the attacher (16) further comprises a lower attacher (16B) having two lower attacher openings (16BA) each on opposite distal ends, two attacher fasteners (16C) each of which are securely positioned within the two upper attacher openings (16AA) and the two lower attacher openings (16BA).

9. The dual handle brake (10) as described in claim 2, wherein the attacher (16) further comprises an attacher fastener nut (16CA) securely attached thereto.

\* \* \* \* \*